US011164121B1

United States Patent
Snider et al.

(10) Patent No.: US 11,164,121 B1
(45) Date of Patent: Nov. 2, 2021

(54) TASK COMMUNICATION AND MANAGEMENT SYSTEM

(71) Applicant: General Atomics Aeronautical Systems, Inc., San Diego, CA (US)

(72) Inventors: Justin W. Snider, San Diego, CA (US); Jonathan H. Brothers, Temecula, CA (US); Edwin D. Kimzey, Jr., La Jolla, CA (US); Darren R. Moe, Poway, CA (US); Chad W. Nanney, West Point, UT (US); Kurt W. Reindel, San Diego, CA (US); Chen Li, Escondido, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 264 days.

(21) Appl. No.: 16/022,575

(22) Filed: Jun. 28, 2018

Related U.S. Application Data (63) Continuation of application No. 15/994,041, filed on May 31, 2018, now abandoned.

(51) Int. Cl.
*G06Q 10/00* (2012.01)
*G06Q 10/06* (2012.01)
(Continued)

(52) U.S. Cl.
CPC .... *G06Q 10/063114* (2013.01); *B64C 39/024* (2013.01); *G06Q 10/06398* (2013.01);
(Continued)

(58) Field of Classification Search
CPC ... G06Q 10/063114; G06Q 10/063118; G06Q 10/06398; G06Q 50/26; B64C 39/024; B64C 2201/121; B64C 2201/141
See application file for complete search history.

(56) References Cited

U.S. PATENT DOCUMENTS

2010/0257015 A1* 10/2010 Molander .......... G06Q 10/1097 705/7.21
2012/0110087 A1* 5/2012 Culver ................ G06Q 10/067 709/205
(Continued)

OTHER PUBLICATIONS

Moskal,Michael D.,II. "Adaptive Unmanned Aerial Vehicle Routing Methods for Tactical Surveillance Operations." Order No. 10013584 State University of New York at Buffalo, 2016. Ann Arbor. (Year: 2016).*
(Continued)

*Primary Examiner* — William S Brockington, III
(74) *Attorney, Agent, or Firm* — Fitch, Even, Tabin & Flannery LLP (57) ABSTRACT

Systems, apparatuses, and methods are provided herein for facilitating task assignments and communications. A task defining interface is provided on a user device associated with a task team member. Tasks are defined with a task request comprising a task identifier associated with a target location, a task instruction identifier comprising a first symbol followed by a task instruction, and a plurality of task team member identifiers each comprising a second symbol followed by a user handle, wherein the task instruction specifies one or more characteristics of the first task to be performed at the target location. The system is further configured to display tasks associated with a user account based on task team member identifiers and automatically communicate, via the task view interface, each of the one or more task instruction identifiers associated with the task record to each task team member associated with the task record.

18 Claims, 9 Drawing Sheets

(51) Int. Cl.
*G06Q 50/26* (2012.01)
*B64C 39/02* (2006.01)

(52) U.S. Cl.
CPC ..... *G06Q 10/063118* (2013.01); *G06Q 50/26* (2013.01); *B64C 2201/121* (2013.01); *B64C 2201/141* (2013.01)

(56) References Cited

U.S. PATENT DOCUMENTS

| | | | | |
|---|---|---|---|---|
| 2013/0332162 | A1* | 12/2013 | Keen | G06F 40/10 704/235 |
| 2014/0222248 | A1* | 8/2014 | Levien | B64C 39/024 701/2 |
| 2015/0142491 | A1* | 5/2015 | Webb | G06Q 10/063114 705/7.15 |
| 2016/0342571 | A1* | 11/2016 | Lane | H04W 4/18 |
| 2017/0032334 | A1* | 2/2017 | Martinez | G06Q 50/163 |
| 2017/0236428 | A1* | 8/2017 | High | G06Q 10/06 701/120 |
| 2017/0323235 | A1* | 11/2017 | Johnston | H04W 4/00 |
| 2018/0096588 | A1* | 4/2018 | Shabah | G06Q 50/265 |

OTHER PUBLICATIONS

Cornell, Alex, Mills, Phil; "Gofor: Drones on Demand"; https://web.archive.org/web/20180302004113/http://www.gofordrones.com:80/; Sep. 12, 2018; pp. 1-5.

* cited by examiner

Product Feed | All Feeds

@ISR_OPS
1610, 10.03.2017 tgt99

@ISR_OPS
1714, 10.10.2017 xyz77

TASK COMMUNICATION AND MANAGEMENT SYSTEM

CROSS REFERENCE TO RELATED APPLICATION(S)

This application is a continuation of U.S. application Ser. No. 15/994,041 filed May 31, 2018, which is incorporated herein by reference in its entirety.

TECHNICAL FIELD

This invention relates generally to electronic communication systems.

BACKGROUND

Initiating and managing military tasking and missions are traditionally cumbersome and time-consuming processes. Once a task is initiated, it can also be difficult for team members to manage tasks, communicate with other task units, and provide status updates while out in the field.

BRIEF DESCRIPTION OF THE DRAWINGS

Disclosed herein are embodiments of apparatuses and methods for facilitating task communications and assignments. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/ or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for facilitating task assignments and communications. A system for facilitating task assignments and communications comprises a task database storing a plurality of tasks, each task comprising a target identifier, one or more task instruction identifiers, and one or more task team member identifiers, a communication device configured to communicate with a plurality of user devices, and a processor coupled to the task database and the communication device. The processor being configured to provide, via the communication device, a task defining interface on a first user device associated with a first task team member, receive, via the task defining interface implemented on the first user device, a first task request for defining a first task, the first task request comprising a first task identifier associated with a target location, a task instruction identifier comprising a first symbol followed by a task instruction, and a plurality of task team member identifiers each comprising a second symbol followed by a user handle, wherein the task instruction specifies one or more characteristics of the first task to be performed at the target location, generate a first task record in response to receiving the first task request and store the first task record in the task database, the first task record comprises the first task identifier, the task instruction identifier, and the plurality of task team member identifiers, provide a task view interface configured to display tasks associated with a user account based on task team member identifiers associated with the plurality of tasks in the task database, and automatically communicate, via the task view interface, each of the one or more task instruction identifiers associated with the first task record to each task team member associated with the first task record.

Generally, according to some embodiments, a map-based interface is provided to facilitate fast and intuitive task management with minimal system interaction. The user interface leverages symbols to identify and inform users with mission specific information. These symbols allow easy searching, tracking, and sharing of tasking and mission data. A single symbol and associated verbiage added to a mission tasking can instantly render the tasking discoverable by the entire user community. System users, who can also be identified by a symbol, may also share and comment seamlessly with other system users via the interface.

Figure 1:
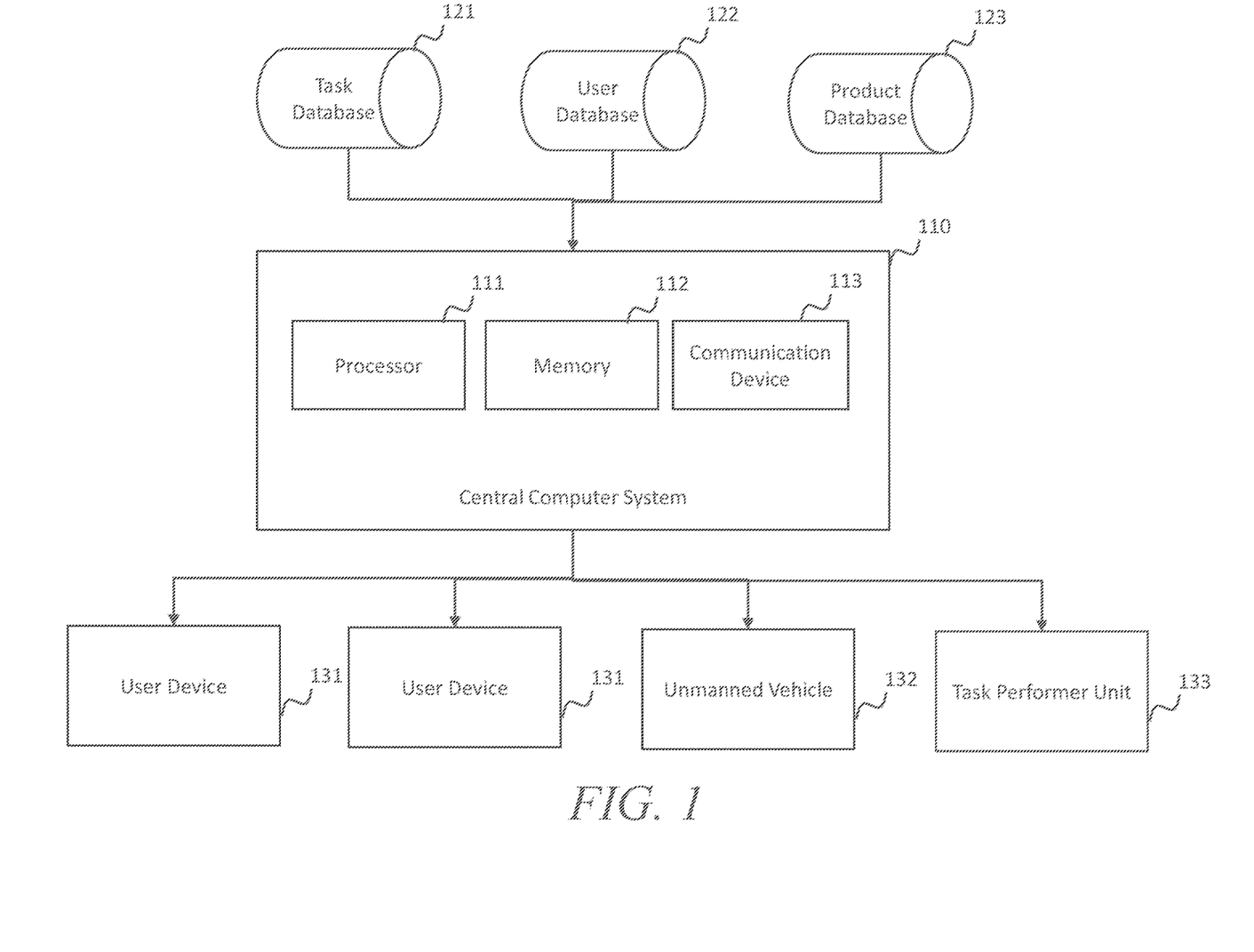
FIG. 1 comprises a system diagram in accordance with several embodiments.

Referring now to FIG. 1, a system for facilitating task communication and assignment is shown. The system comprises a user database 122, a task database 121, a product database 123, and a central computer system 110 in communication with one or more user devices 131, unmanned vehicles 132, and task performer units 133.

The central computer system 110 comprises a processor 111, a memory 112, and a communication device 113. The processor 111 may comprise a control circuit, a central processor, a microprocessor, a microcontroller, and the like and is configured to execute computer-readable instructions stored in a computer-readable storage memory 112. The computer-readable storage memory 112 may comprise volatile and/or non-volatile memory and have stored upon it a set of computer readable instructions which, when executed by the processor 111, causes the processor 111 to provide a task user interface for display on one or more the user devices 131 via the communication device 113. In some embodiments, the task management user interface may comprise a graphical user interface (GUI) provided over network connection such as the Internet, a private network, a secure network, a local network, etc. In some embodiments, the central computer system 110 may be configured to generate or modify task records in the task database 121 based on communications with one or more of the user device 131, the unmanned vehicle, 132, and the task performer unit 133. In some embodiments, the central computer system 110 may be configured to provide task user interfaces based on user accounts and preferences in the user database 122 and/or user team associations in the task database 121. In some embodiments, the central computer system 110 may be configured to track the status of task units registered with the system such as an unmanned vehicle 132 and task performer unit 133. In some embodiments, the central computer system 110 may further be configured to assign tasks to users, unmanned vehicles 132, and/or task performer unit 133 based on task records in the task database 121 and unit information in the user database 122. In some embodiments, the central computer system 110 may be configured to perform one or more steps described with reference to FIG. 2 herein. In some embodiments, the central computer system 110 may be configured to provide a task communication and management user interface described with reference to FIGS. 3-9 herein.

The task database 121 is configured to store a plurality of task records. Task records may be generated in response to a user submitting a task request through the user interface provided by the central computer system 110. In some embodiments, the central computer system 110 may be configured to parse information in the task request and populate various fields of a task record. In some embodiments, the central computer system 110 may further be configured to parse task-related communications between team members to update task records. In some embodiments, a task record comprises a task identifier, a task instruction identifier, and team member identifiers. In some embodiments, a task record may further include task description tags, task product feed, data collected related to the task, task completion status, task target location, tasked unit information, etc. As used herein, a symbol followed by an unbroken string of alphanumeric character (e.g. "#co110") may generally be referred to as a tag. A user inputted tag may correspond to a task identifier, a task instruction, a task description, a task status update, etc. In some embodiments, task team members may comprise persons participating in completing the first task and/or automated system configured to perform actions based on the task instruction. Generally, a task record may record any information defined by the initiating user, information derived from the communications between team members, data collected related to the performance of the task, and/or data supplied by task units related to the performance of the task. In some embodiments, tasks stored in the task database 121 may comprise tasks to be performed by one or more of an unmanned aerial vehicle, a manned aerial vehicle, a piloted aerial vehicle, an autonomous aerial vehicle, a manned ground vehicle, an unmanned ground vehicle, and personnel. In some embodiments, tasks may comprise one or more of data collection task, supply delivery task, or military strike task.

The user database 122 is configured to store user profiles for users with accounts registered with the task user interface. User profiles may comprise username, user role, user access permission, user preferences, user team association, preferred tags, etc. Generally, user profiles may store any user related information used to provide the task user interface to the user and/or assign tasks to users.

The product database 123 is configured to store task product information. Products may generally refer to information and intelligence derived documentation associated with the task that is shared with the user community. In some embodiments, products may comprise one or more of image files, video clips, photographs, text document, sensor data, and the like. In some embodiments, products in the product database 123 may comprise any data collected and/or generated with the performance of a task. In some embodiments, products in the product database 123 may be stored with one or more tags associated with the task that generated the product such that the products are searchable with the tags. In some embodiments, products collected from one task may be shared with a second task via the user interface for the performance of the second task. The product feed interface 800 shown on FIG. 8 and product feed 901 shown in FIG. 9 are examples of products stored in the product database 123 according to some embodiments.

While the task database 121, the user database 122, and the product database 123 are shown to be outside of the central computer system 110, in some embodiments, the task database 121, the user database 122, and/or the product database 123 may be implemented on the memory 112 and/or one or more other computer-readable memory storage devices coupled to the processor 111 of the central computer system 110. In some embodiments, the task database 121, the user database 122, and/or the product database 123 may be accessed by the central computer system 110 via a wired or wireless data connection and/or via a network.

The user devices 131 generally comprise processor-based user interface devices. In some embodiments, the user devices 131 may each comprise a processor, a memory device, and one or more user input/output devices. In some embodiments, the user devices 131 may comprise one or more of a smartphone, a mobile device, a head-mounted display, a virtual reality (VR) display device, an augmented reality (AR) display device, a wearable device, a tablet computer, a laptop computer, a desktop computer, an internet of things (TOT) device, etc. In some embodiments, user input/output devices may comprise one or more of a display screen, a touch screen, a VR display, an AR display, one or more buttons, a keypad, a microphone, a speaker, a camera, a motion sensor, an eye movement sensor, etc. A user device 131 may generally be configured to display a task user interface to a user based on communications with the central computer system 110. In some embodiments, the task user interface may comprise one or more of a software program, a mobile application, a cloud-based application, a web page, and the like. In some embodiments, the task user interface may comprise a task defining interface configured for the user to create and submit task requests to initiate a new task. In some embodiments, the task user interface may comprise a task viewing interface for displaying task information provided via the central computer system 110 comprising one or more of task location, task completion status, task team members, task product feed, task comments, task instruction tags, task descriptions, etc. In some embodiments, a user may also edit and comment on tasks using the task viewing interface.

The unmanned vehicle 132 may comprise a remote piloted vehicle, an autonomous vehicle, a semi-autonomous vehicle, and the like. In some embodiments, the unmanned vehicle 132 may comprise aerial, ground, and/or water vehicles. In some embodiments, the unmanned vehicle 132 and/or a remote pilot system of the vehicle may be configured to receive task assignments and instructions from the central computer system 110. The task assignments and instructions may be generated and/or assigned via information users entered through the task user interface displayed on the user device 131. In some embodiments, an unmanned vehicle 132 may further be configured to provide status information such as current location and task completion status to the central computer system 110. In some embodiments, an unmanned vehicle 132 may further be configured to collect data at a target location and provide the collected data to the central computer system 110. In some embodiments, the collected data may comprise recorded video, photograph, real-time video feed, thermal image, radar scan, signal intelligence data, and the like. The central computer system 110 may automatically update task information and task feed displayed in the task user interface based on the information received from an unmanned vehicle 132.

The task performer unit 133 may generally refer to devices and/or vehicles that participate in the performance and/or management of tasks. In some embodiments, a task performer unit may comprise a processor-based device, a robotic unit, a vehicle, an automated system, etc. In some embodiments, the unmanned vehicle 132 may be an example of a task performer unit. Other types of task performer unit 133 may comprise stationary sensors, imaging units, data analytic systems, control center systems, communication systems etc. A task performer unit 133 may be configured to automatically carry out actions based on task instructions receive through the task use interface. For example, a user may enter a task instruction identifier in the user interface to instruct a stationary camera or a camera carried a vehicle to capture images of a target location or object. In another example, a GPS tracker on a vehicle may provide vehicle information to the central computer system 110. In yet another example, a display device or a speaker may be configured to relay task instruction to a human operator without the operator accessing the task user interface. In some embodiments, task information and instructions may be used by other types of user interfaces (e.g. remote pilot controls, vehicle dash display) running on the task performance units 133. A task performer unit 133 may further be configured to communicate its status and captured data to the central computer system 110. The central computer system 110 may automatically update task information and task feed displayed in the task user interface based on the information received from one or more task performer units 133. In some embodiments, a unit database coupled to the central computer system 110 may store unit information such as unit identifier, unit capability, unit status, unit location, unit availability, communication and access credentials, etc. In some embodiments, unit information may be displayed in the task user interface for associated tasks. In some embodiments, unit information may be used to communicate instructions and/or assign tasks and actions associated with a task to units.

While only two user devices 131, one unmanned vehicle 132, and one task performer unit 133 are shown in FIG. 1, the central computer system 110 may simultaneously communicate with a plurality of user devices associated with a plurality of user to provide task user interfaces to any number of user devices and communicate with a plurality of vehicles and task performer units.

Figure 2:
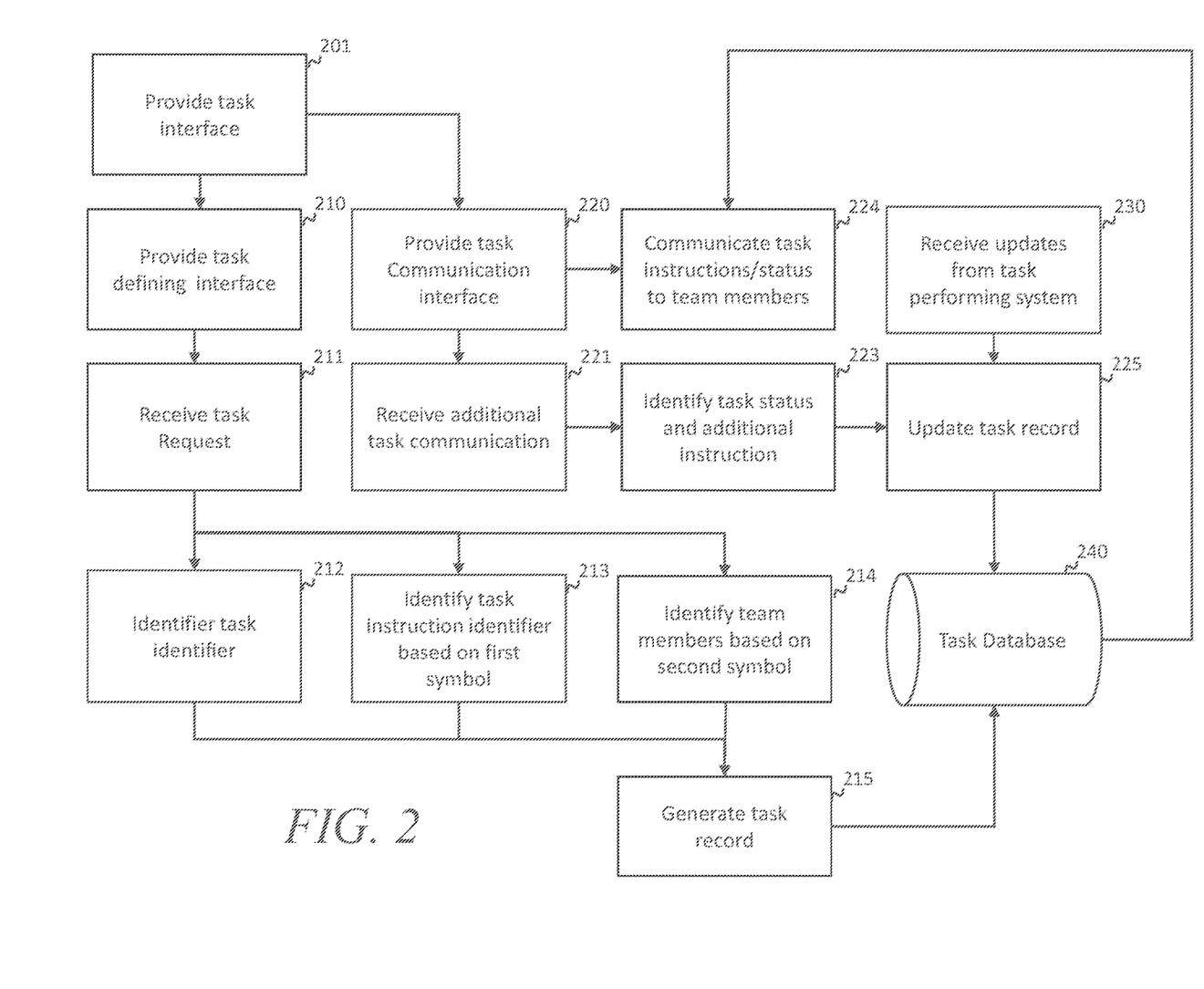
FIG. 2 comprises a flow diagram in accordance with several embodiments.

Referring now to FIG. 2, a method for facilitating task communication and assignment via electronic user interfaces is shown. In some embodiments, the steps shown in FIG. 2 may be performed by a processor-based device such as one or more of a central computer system, a server, a user device, and a task performer unit. In some embodiments, the steps in FIG. 2 may be performed by one or more of the central computer system 110, the user device 131, the unmanned vehicle 132, and the task performer unit 133 described with reference to FIG. 1 herein or similar devices.

In step 201, the system provides a task user interface. In some embodiments, the task user interface is provided by a central computer system to a first user device associated with a first task team member via a communication device. In some embodiments, the first user device comprises a processor-based device implementing the user interface based on communications with the central computer system. In some embodiments, the user device may comprise the user device 131 described with reference to FIG. 1 herein and/or similar devices. In some embodiments, the task user interface may comprise one or more of a software program, a mobile application, a cloud-based application, a web page, and the like. The user may be required to provide log-in credential, biometric data, and/or other such information, and the user interface may be provided based on user's profile and preferences stored in a user database. In the task user interface, the user may select to define a new task and/or view existing tasks. In some embodiments, the selection may be performed via a side menu shown in FIG. 3 herein or similar interfaces.

In step 210, the system provides a task defining interface to the user. In some embodiments, the task defining interface may comprise one or more fields to input parameters of a task request. In some embodiments, the task defining interface may comprise free-form text entry field for entering a string of text as a task request. In some embodiments, the task defining interface may provide a drop-down menu, suggested tags, suggested team members, autofill text, etc. to assist in filling out a task request via the user interface. An example of a task defining interface is described with reference to FIG. 4 herein.

In step 211, the system receives a task request via the user interface. In some embodiments, a new task request may be initiated by the user selecting a "add new task" icon in the task user interface. In some embodiments, the task interface may comprise a graphical display of a map configured to receive a location selection from the user to define the target location for the task. In some embodiments, a task instruction specifies one or more characteristics of the first task to be performed at the target location. In some embodiments, a task request may comprise a task identifier associated with a target location, a task instruction identifier comprising a first symbol followed by a task instruction, and a plurality of task team member identifiers each comprising a second symbol followed by a user handle. In some embodiments, the task request may comprise other information as description tags, task type, assigned unit, etc. In some embodiments, a task request may specify a task to be performed by one or more of an unmanned aerial vehicle, a manned aerial vehicle, a piloted aerial vehicle, an autonomous aerial vehicle, a manned ground vehicle, an unmanned ground vehicle, and personnel. In some embodiments, tasks may comprise one or more of data collection task, supply delivery task, or military strike task.

In some embodiments, the system may parse the task request for task parameters. In step 212, the system identifies the first task identifier in the first task request based on a first symbol (e.g. "#"). As used herein, a symbol followed by an unbroken string of alphanumeric characters (e.g. "#co110") may generally be referred to as a tag. In some embodiments, the task identifier may correspond to the alphanumerical string entered into a task name field in the task defining interface. In some embodiments, the system may be configured to identify the first tag in a free-form task request as the task identifier. The task identifier may correspond to the name of the task, and may generally be used by the user to refer to the task.

In step 213, the system identifies a task instruction identifier in the task request. In some embodiments, a task instruction identifier is identified based on identifying the first symbol and a concatenated accompanying task instruction comprising one of a set of predefined alphanumeric strings. In some embodiments, the first symbol comprises a "pound" symbol ("#"). In some embodiments, the task instruction comprises a tag. The system is generally configured to associate the task instruction specified in the task instruction identifier with the first task identifier in the first task record. A task instruction identifier/tag may comprise an instruction to a team member and/or an automated unit to perform an action associated with the task. In some embodiments, the task instruction comprises one or more of priority identifier, human operator instruction, machine instruction, drone instruction, task objective, or operational details. In some embodiments, the system may distinguish between a human instruction, a machine instruction, descriptive tags, etc. based on a lookup table of predefined tags. In some embodiments, the task instruction identifier may comprise machine instruction configured to trigger an automatic action at a task executing processor-based system. In some embodiments, a third symbol (e.g. "!") following the first symbol (e.g. "#") may indicate that the task instruction corresponds to a machine instruction. In some embodiments, other additional symbols may be used to indicate other types of tags.

In step 214, the system identifies team members in the task request. In some embodiments, the system identifies a plurality of task team members specified in the first task request based on identifying the second symbol and concatenated alphanumeric user handles. In some embodiments, the second symbol comprises an "at" symbol ("@"). The system is generally configured to associate each of the plurality of task team members with the first task identifier. Team members generally refer to members who participate in managing, tasking, and/or performing the task. In some embodiments, team members may comprise personnel the can access and/or modify the task through the task user interface. In some embodiments, team members may further comprise vehicles and/or task performing units that receive machine instructions from the central computer system and/or operated by another team member. For example, an unmanned aerial vehicle (UAV) may be added as a team member and/or a tasked unit by the UAV's call sign (e.g. "@COBRA05"). In some embodiments, vehicles and/or task performing units may be assigned a task through their handle through the task request entered in the task user interface.

In step 215, the system generates a task record for the requested new task. The task record may comprise information parsed/identified in steps 212, 213, and 214. In some embodiments, a first task record comprises the first task identifier, the task instruction identifier, and the plurality of task team member identifiers. In some embodiments, the task record may store other information such as the task initiating user handle, tasked unit, task descriptions, task location, task status, etc. The generated task is stored in the task database 240. In some embodiments, the task database 240 may comprise the task database 121 described with reference to FIG. 1 or a similar database. In some embodiments, when a task record is created, the system may identify a task instruction directed to automated task performer units and forward the instructions to the tasked units.

In step 220, the system provides a task view interface. In some embodiments, the task view interface is configured to display tasks associated with a user account based on task team member identifiers associated with the plurality of tasks in the task database. In some embodiments, a user may generally see tasks on which they are team members. In some embodiments, the task view interface comprises a graphical display of a map displaying tasks at corresponding target locations and tasks on the map are represented by markers comprising color-coded status indicators. In some embodiments, the task view interface further comprises search and/or sort functions for users to find and organize multiple tasks.

In step 224, the system communicates task instructions and statuses to team members via the task view interface. In some embodiments, task instructions and statuses may be updated in real time or near real time on each active user's device. In some embodiments, task status information comprises one or more of location of the tasked unit, estimated time of arrival, collected data, task completion status, team member status, etc. Examples of a task view interface are described with reference to FIGS. 3 and 6-9 herein. In some embodiments, step 224 may further comprise communicating any machine instructions to task performer units that do not access task records through the task user interface. In some embodiments, a task performer unit, such as an unmanned vehicle, may be configured to identify a first task instruction directed to the tasked unit, automatically perform an action based on the first task instruction, and generate and transmit an additional task communication based on the performance of the first task instruction. In some embodiments, the system may be configured to identify machine instructions and the associated task unit for performing the task in the user inputs received through the task user interface and selectively relay task instructions to tasked units. In some embodiments, one or more task performer units may be configured to parse instructions from user entered task requests, comments, and task records in the task record database to identify instructions to execute.

In step 221, the system receives additional task communications. In some embodiments, the task view interface comprises a free-form text entry field configured to receive comments and additional task instruction identifiers for one or more tasks. An example of a text entry field for receiving comments and additional task instructions is described with reference to FIG. 8 herein. In some embodiments, the additional comments and task instructions may comprise one or more symbols for identifying team members, task instructions, task statuses, etc. In step 223, the system identifies task statuses and additional instructions in the task communication received in step 221. In some embodiments, task instructions and statuses in the additional comments may be identified based on steps similar to step 212-214. For example, a symbol (e.g. "#") followed be predefine words and phrases may indicate an additional instruction or a task status. In some embodiments, the system is configured to receive, over time, a plurality of additional task communications. For each additional task communication, the system may identify a task record in the task database associated with the additional task communication based on identifying a task identifier, comprising the first symbol concatenated by an alphanumeric task identifier. In some embodiments, the system may extract, from the additional task communication, task status information and identify team members associated with the task based on task team member identifiers associated with the task record. The system may further automatically distribute and/or communicate the task status information or relevant portions of the task status information to each of the team members associated with the task identifier associated with the task record and/or specified within the additional task communication. After step 223, the system uses the information identified in step 223 to update the task record. Updates may comprise additional instructions, additional comments, updated task status, updated task description, etc. The information in the updated task record may then subsequently be displayed in the task view user interface to users. In some embodiments, additional task comments and instructions may appear as a chat room or messenger message in the task interface and may be displayed to one or more team members in near real-time before, during, or after steps 223 and 225.

In some embodiments, the system may further receive updates from task performer units in step 230. In some embodiments, a task performer unit may comprise the unmanned vehicle 132, the task performer unit 133, and/or similar devices. In some embodiments, task status information received from a task performer unit may comprises one or more of: an image, a video, communications, movement information, a count of a type of object associated with the target location, identifying information of a person associated with the target location, an additional task instruction, etc. In some embodiments, step 230 may occur outside of the task user interface. For example, the task performer unit may comprise an automated unit configured to automatically transmit its status and/or collected data to the central computer system without human intervention. Updates from task performer units may also be used to update the task record in step 225. In some embodiments, when the task record is updated in step 225, the system may further be configured to provide additional instructions to one or more task performer unit based on the update. The instructions may cause the task performer unit to carry out an action with or without further human operator input. Updates provided by task performer units may also be displayed to users in step 224.

In some embodiments, one or more of the steps described with reference to FIG. 2 may be repeated multiple times as a user uses a task user interface to define, manage, and view tasks, as status information is received, and/or other information corresponding to a task record is obtained. In some embodiments, multiple instances of steps described in FIG. 2 may be carried out simultaneously on a central computer system for a plurality of users, task teams, and task performing units. With the steps described with reference to FIG. 2, the system may provide a task management and communication user interface that makes use of symbols (e.g. "#", "@", "!") in cooperation with alphanumeric strings to facilitate task creation and task-related communications. Tasks created and modified according to the steps described herein may also be easily searchable and sortable based on the instruction and description tags associated with the task record. In some embodiments, the system also allows users to provide precise instructions to other team members and/or task performing units using simple text entry.

Referring now to FIGS. 3-9, illustrations of graphical user interfaces for task communication and management according to some embodiments are shown. The user interfaces may comprise the task management user interface described herein for facilitating task-related communications and assignments. The user interfaces are generally generated and provided by a processor-based device having at least a control circuit and a memory. In some embodiments, the user interfaces may be supported by a central computer system and provided for display on a plurality of end user devices over a network such as the Internet, a secured network, a private network, a virtual private network, etc. In some embodiments, the user interfaces may be implemented as a computer program, a web page, a mobile application, and the like. In some embodiments, the user interfaces described with reference to FIGS. 3-9 may be provided by the central computer system 110 described with reference to FIG. 1 or similar devices, and may be displayed on a user device 131 and/or a task performer unit 133 described with reference to FIG. 1 or similar devices.

Figure 3:
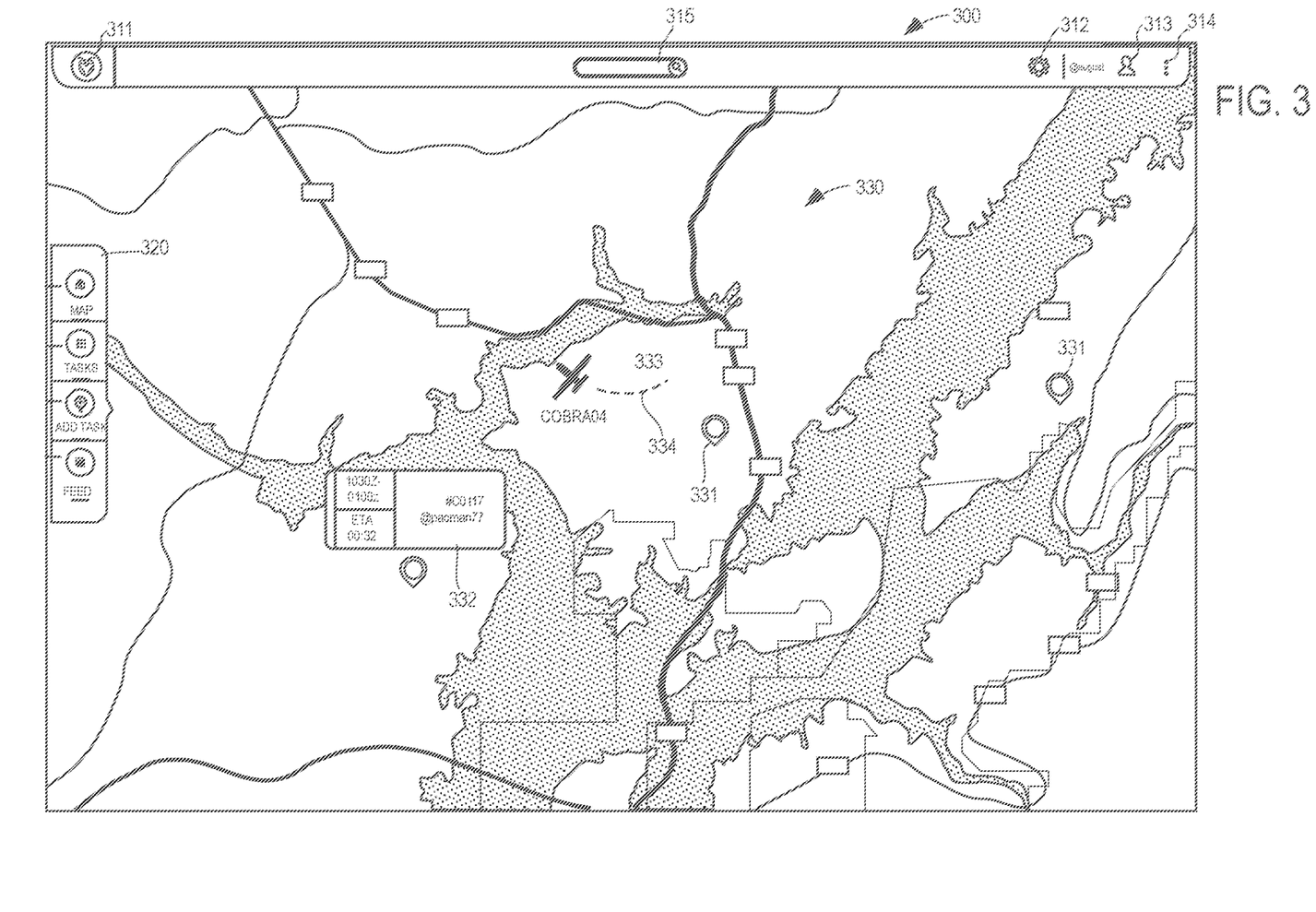
FIGS. 3, 4, 5, 6, 7, 8, and 9 comprises illustrations of graphical user interfaces in accordance with several embodiments.

In FIG. 3, an example of a map view of a user interface is shown. The user interface 300 comprises a top menu bar, a side menu bar 320, and a graphical display of a map 330. The top menu bar may comprise selectable icons such as a home button 311 configured to take the user back to the default map view, a settings icon 312 providing access to application preference settings, a profile icon 313 providing access to user profile and user preference setting, and an additional action button 314 for other options. User profile settings are described in more detail with reference to FIG. 5 herein. The top menu may further include a search bar 315 that allows the user to perform a global search based on users, description tags, tasks, locations, instructions, etc. In some embodiments, the top menu may visible and accessible to the user as the user navigates through different sections and pages of the user interface. In some embodiments, the map view may comprise other viewing controls such as zoom controls and layer controls for selecting the information to be displayed on the map (e.g. task filters, task units, city names, roadway, etc.) In some embodiments, the map view may further include controls for the user the draw a geofence to restrict the movement of one or more task units.

The side menu bar 320 provides a selection of different view and actions. In some embodiments, the side menu bar 320 comprises a map button that takes the user to a map view, a task button that provides a task view interface that list tasks that the user can view and edit, an "add task" button that provides an interface for defining a task, and a feed button that provides the user with product feeds such as imaged or videos related to defined tasks. In some embodiments, the map view button takes the user to the map view described with reference to FIG. 3 herein. In some embodiments, the task button provides the user the task listing described with reference to FIG. 6 and/or FIG. 7 herein. In some embodiments, the add task button takes the user to a task defining interface described with reference to FIG. 4 herein. In some embodiments, the feed button provides the product feed interface described with reference to FIG. 8 and/or FIG. 9 described herein. In some embodiments, one or more of the interfaces described with reference to FIGS. 4-9 may be displayed as an insert or overlay in the user interface shown in FIG. 3. For example, the task defining interface may be displayed as a window over the map 330 in FIG. 3, with the top menu bar and the side menu bar 320 still visible and accessible.

The map 330 in the graphical user interface generally comprises a representation of a geographic area. In some embodiments, the map may comprise a geographic map, a road map, a nautical map, a satellite image, an aerial image, a 3D map, and the like. In the map view, defined tasks are represented by markers 331 at their corresponding location. In some embodiments, tasks on the map are represented by markers comprising color-coded status indicators. For example, a gray marker pin may indicate a location/task that has been selected but not defined/saved, a red marker may indicate a target location without associated tasks, an orange pin may indicate an assigned task that has not been completed, a yellow pin may indicate that a task is being performed at the location, and a green pin may indicate that the task has been completed.

In some embodiments, when a marker 331 is selected, a task information box 332 is displayed. The task information box 332 may display information such as the task name and indicator ("#CO117"), assigned team member ("@pacman77"), scheduled performance time (10:30Z-01:00Z), and an estimated time of arrival at the target location ("00:32"). In some embodiments, the information displayed in the task information box 332 may be user-configurable. In some embodiments, a plurality of markers 331 may be selected in the map 330 to display a plurality of task information box 332 simultaneously.

The map 330 may further include displays of task units such as an unmanned aerial vehicle (UAV) 333. A task unit generally refers to personnel, device, and/or vehicle assigned to perform one or more tasks. In some embodiments, a task unit may comprise a team member of a task team. The location of the task unit on the map 330 indicates their current location. The task unit's location may be displayed while they are traveling to and from a target location to perform a task. In some embodiments, the icon of the task unit may comprise a representation of the unit type, such as UAV, UGV, manned convoy, ship, etc. In some embodiments, a representation of the unit further comprises an identifier of the unit, such as the call sign "COBRA04" of the UAV 333. In some embodiments, the identifier of the unit may correspond to the user handle ("@COBRA04") used to assign tasks and communicate with the unit in the user interface. In some embodiments, the display of the unit may further comprise an orientation indicator showing the orientation of the active sensor on the unit and/or a nail trail route indicator 334 showing the path of the unit.

Figure 4:
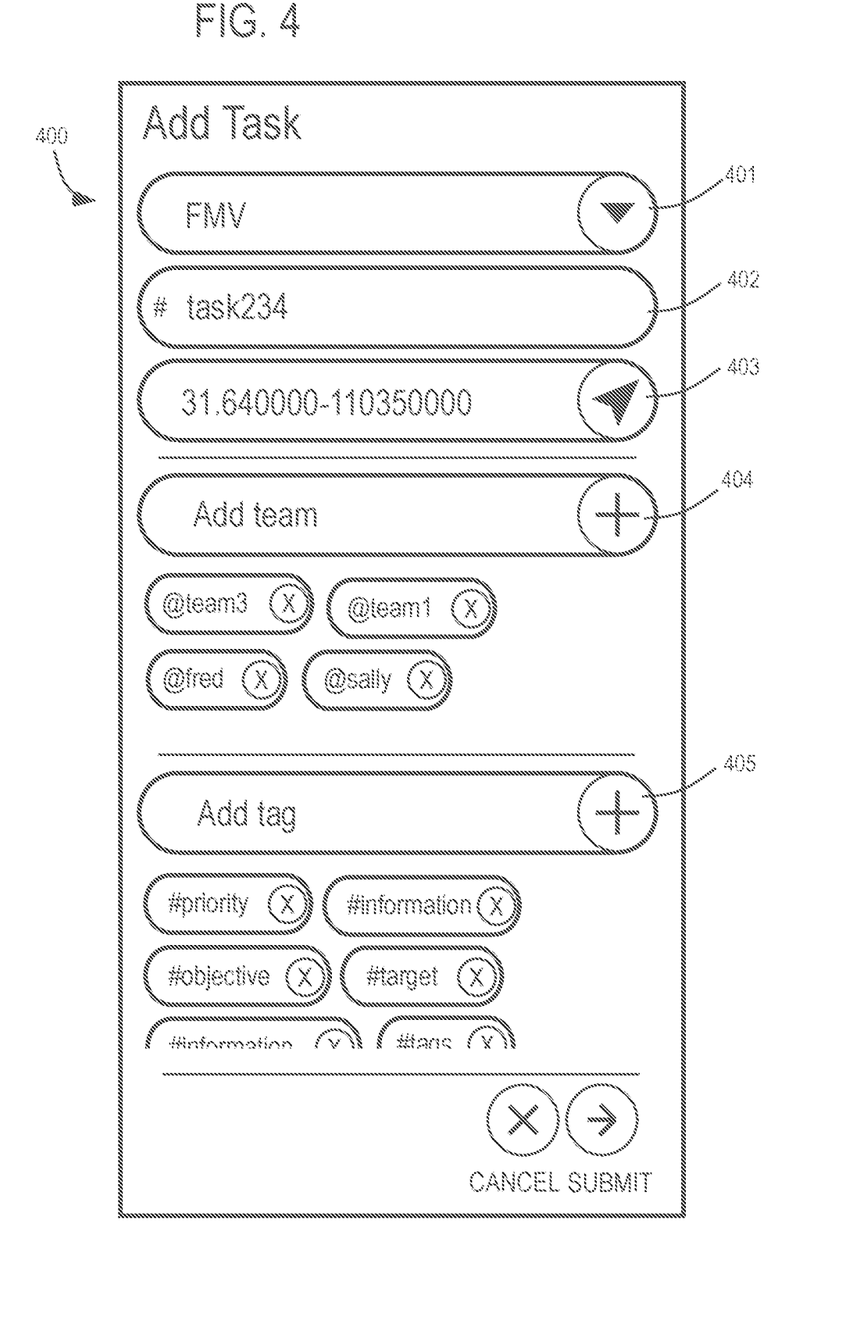

In FIG. 4, an example of an interface 400 for adding/defining a task is shown. In FIG. 4, a user may select a task type 401, enter a task identifier 402, select a target location 403, add team members 404, and add instruction and description tags 405. In some embodiments, the task type 401 may be selected from a drop-down menu. In some embodiments, the task type 401 may correspond to the actions to be carried out for the task, such as data collection task, supply delivery task, or military strike task. In some embodiments, the task type 401 may correspond to the sensor/image type associated with the task such as full motion video (FMV), synthetic aperture radar (SAR) image, moving target indicator (MTI), signals intelligence (SIGINT), etc. In some embodiments, the task identifier 402 may be entered by the user to name the task and/or the task location. In some embodiments, the target location 403 may be typed by the user and/or selected from the map view. In some embodiments, selecting a location on the map may bring up the task defining interface 400 with the location coordinates pre-populated. The team members 404 may be added by entering user handles and/or selecting from user's preselected team member handles. In some embodiments, the system may perform a user handle check to verify that the entered user handle is registered on the system. In some embodiments, the system may automatically add a symbol (e.g. "@") to the user handles entered. Instruction and description tags 405 may be added by entering tags and/or selecting from user's preselected tags. As used herein, a symbol followed by an unbroken string of alphanumeric character (e.g. "#co110") may generally be referred to as a tag. A user inputted tag may correspond to a task identifier, a task instruction, a task description, a task status update, etc. In some embodiments, the system may automatically ad a symbol (e.g. "#") to the entered tags. In some embodiments, a user's preselected team member handles and tags may be configured in a user preferences interface such as the interface described in FIG. 5 herein. In some embodiments, the system may provide auto-complete suggestions for partially entered user handles and/or tags. In some embodiments, entered users handle and/or tags may be displayed with an option to delete them in the task defining interface 400.

While separate data entry fields for task identifier, team member, and description and instruction tags are shown in FIG. 4, in some embodiments, requests to create or modify a task may be entered in a free-form task entry field. The system may then identify one or more of task identifier 402, team member 404, and tags 405 associated with task instructions and/or descriptions based on symbols such as "@," "#," and "!."

Figure 5:
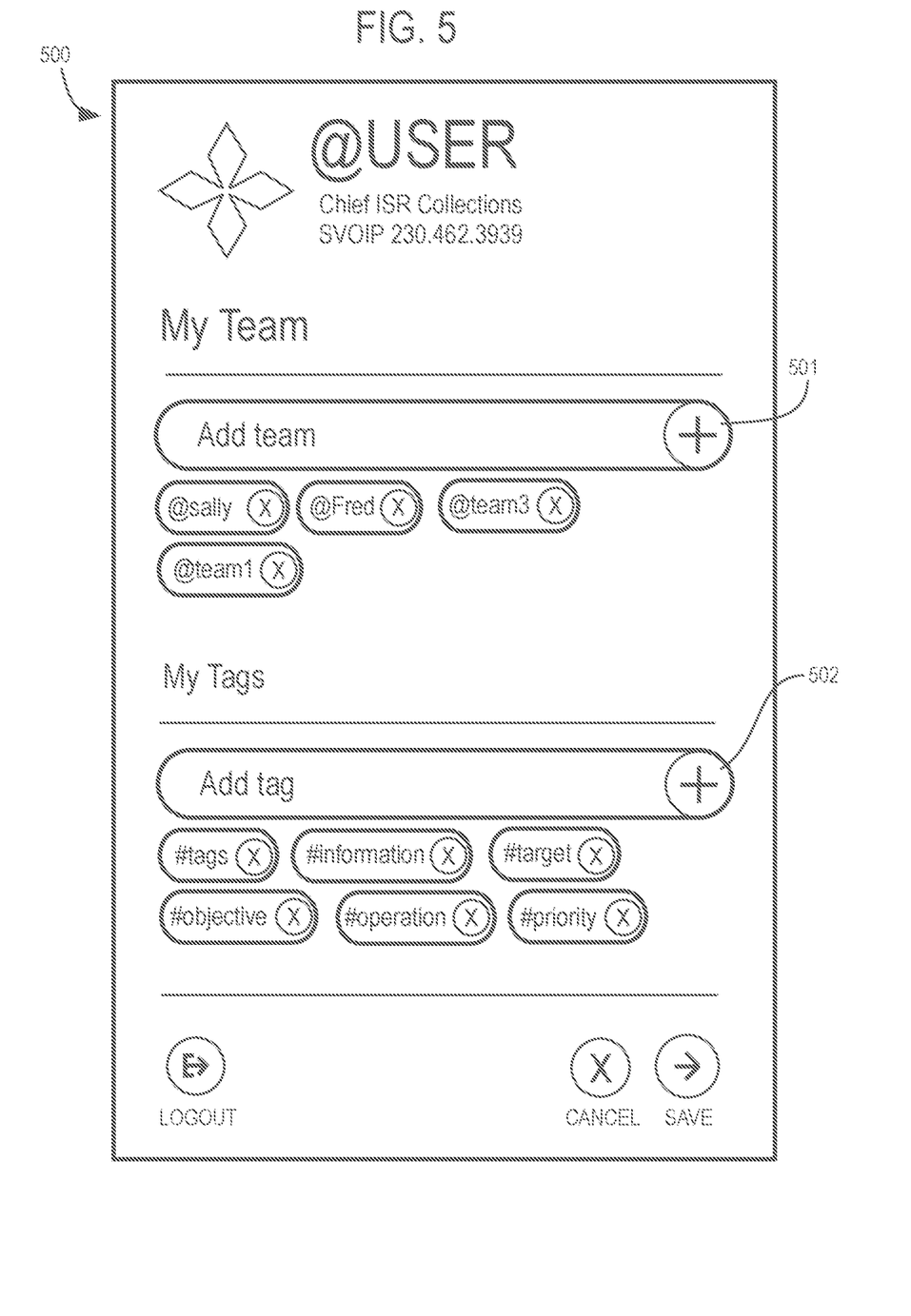

In FIG. 5, an example of a user preference interface is shown. The user preference interface 500 may display the user's profile ID and contact information. The user preference interface 500 may further include a "my team member" 501 area and "my tags" 502 area. In some embodiments, users may define team members and tags that are frequently used in the user preferences interfaces. These preselected team members and/or tags may be displayed for selection in the task defining interface such as the task defining interface 400 described with reference to FIG. 4. In some embodiments, the system may automatically populate new tasks the user creates with the preselected team members and tags. In some embodiments, the system may add or suggest team members tags based on user activity, team association, etc.

Figure 6:
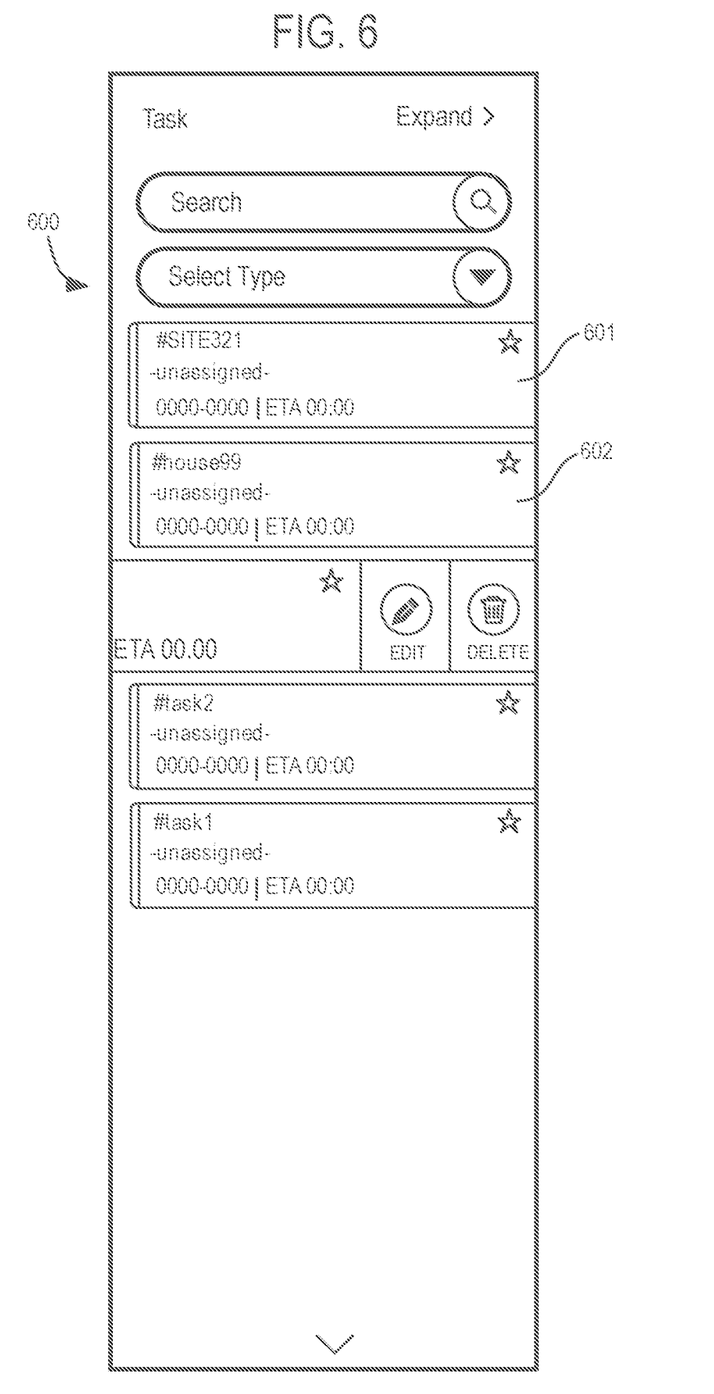

In FIG. 6, an example of a condensed task view interface is shown. The condensed task view interface 600 may be displayed as a window in the map a described with reference to FIG. 1 herein. The condensed task view interface 600 shows a plurality of tasks boxes 601. Each task box may display task information such as task name ("complex 1"), assigned unit ("sabre04"), scheduled task time (0716Z-0730Z), and travel status ("on target," "ETA TBD"), etc. In some embodiments, each task box 601 may include a color-coded task status indicator that indicates the completion status of a task similar to the map markers described with reference to FIG. 3 herein. In some embodiments, each task box 601 may further include a "favorites" icon (e.g. star icon) that allows the user to elevate the task's display order in the task and product feed list. When a task box selected, the user interface may provide options to edit or delete 602 the task. The condensed task view interface 600 may further include the option to search or sort tasks with words, tags, user handles, etc. In some embodiments, a user may further select to expand the task listing to see other details of the task. An example of an expanded task view interface is described with reference to FIG. 7 herein.

Figure 7:
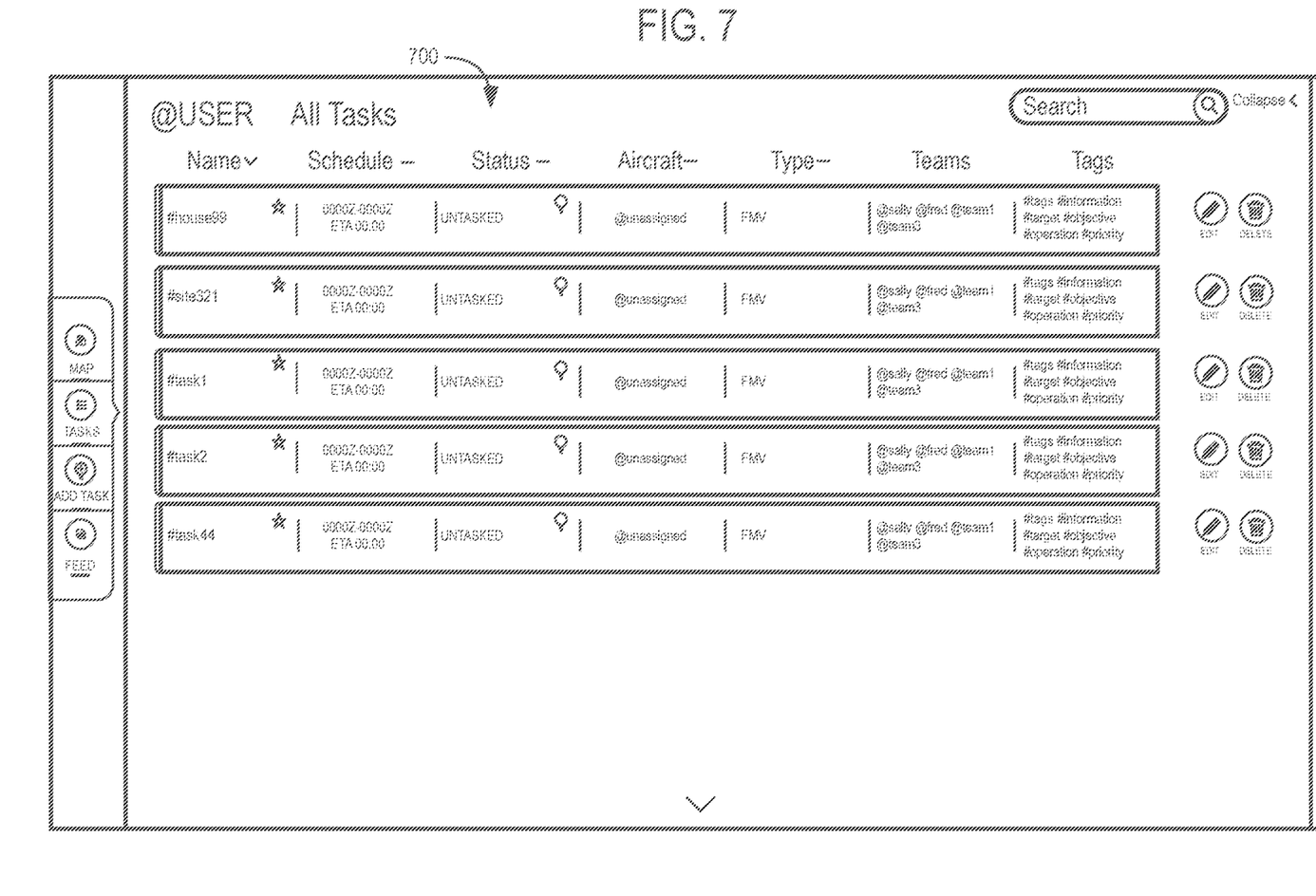

In FIG. 7, an example of an expanded task view interface is shown. In the expanded task view interface 700 various task parameters and status information are displayed in a table. Specifically, in FIG. 7, task record information including task name, schedule time, task status, assigned aircraft, task type, team members, and tags associated with the tasks are shown. In some embodiments, each task listing may include a color-coded task status indicator that indicates the completion status of a task similar to the map markers described with reference to FIG. 3 herein. The interface further provides the option to edit or delete each task. While aircrafts and aircraft call signs are shown in FIG. 7, the task view interface may generally display handles for any type of tasked unit such as UAV, UGV, personnel, sea vessel, etc.

Figure 8:
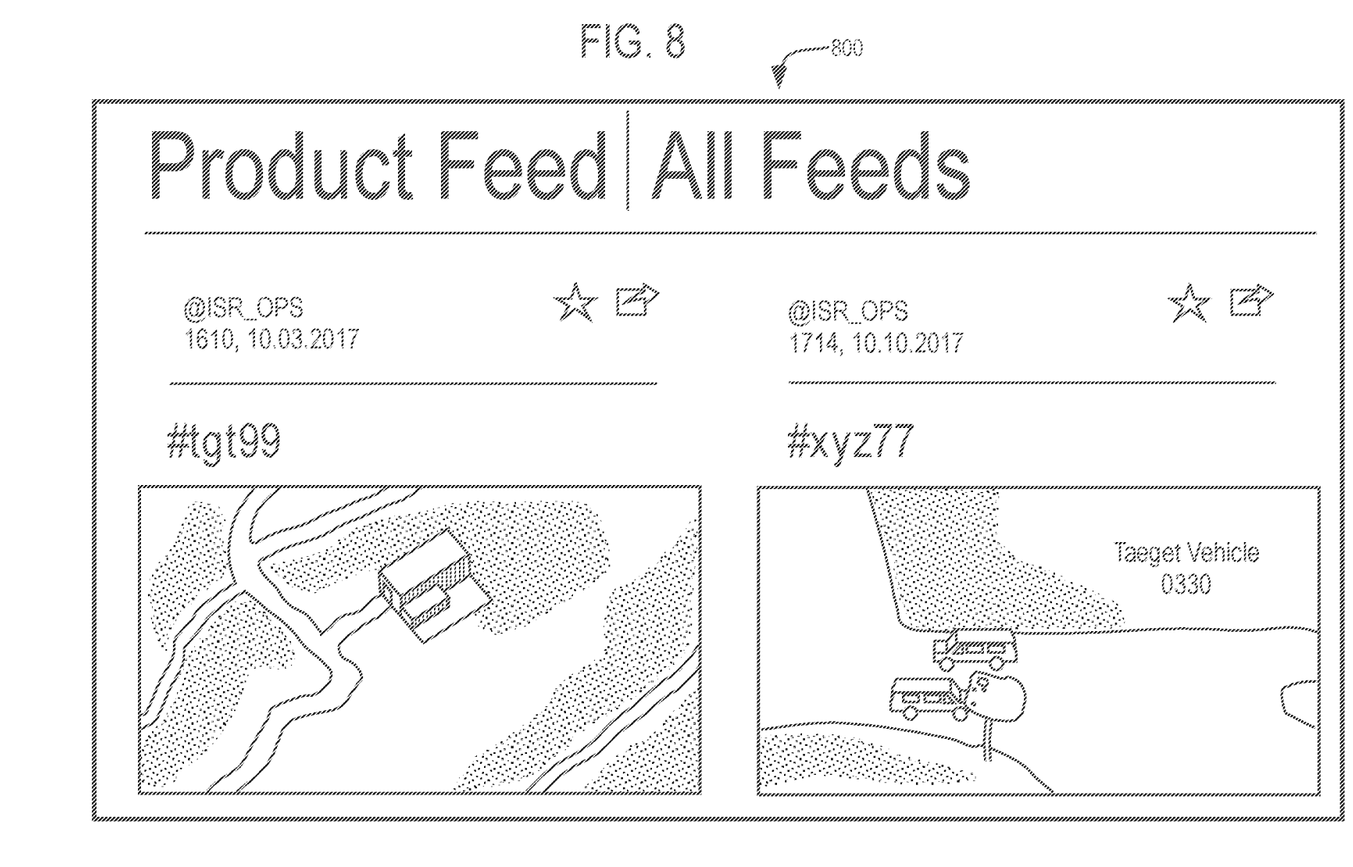
Figure 9:
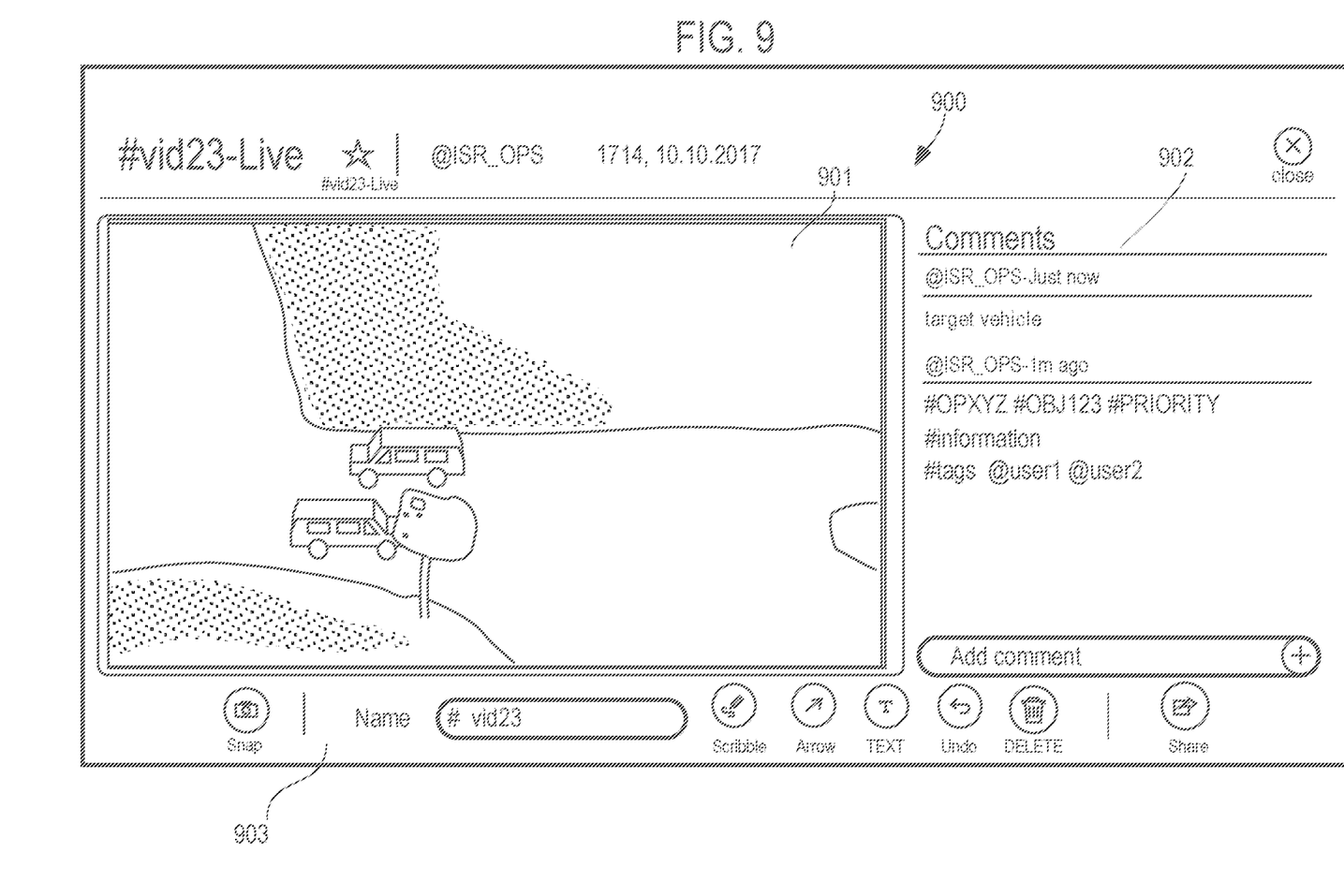

In FIG. 8, an example of a product feed interface 800 is shown. Product feed generally refers to information associated with the performance of a task such as data and images collected by a tasked unit. The product feed may comprise previously captured data and/or real-time information. Each box displaying a product feed may comprise information associated with the feed such as task unit identifier ("@ISR_OPS"), tag or a task identifier, a time stamp ("1610, 10.03.2017"), etc. In some embodiments, product feed may be displayed in a grid showing a plurality of feeds from a plurality of tasks and/or tasked units. In some embodiments, users may further provide a feed identifier ("#HMSITE") to identify feeds associated with one or more tasks.

In FIG. 9, an example of a feed commenting interface is shown. The feed commenting interface 900 includes a display of product feed 901, a comments field 902, and an actions menu 903. In some embodiments, the feed commenting interface 900 may be accessed through the selection of a feed in a product feed interface such as the feed interface described with reference to FIG. 8. In the comments field 902, team members with access to the product feed may enter free-form comments. The comments may include general text, description tags, and/or instruction tags. In some embodiments, users may mark instruction and/or description tags with a first symbol (e.g. "#"). In some embodiments, users may also direct comments to specific team members using a second symbol (e.g. "@"). In some embodiments, the tags entered into the comments field may be automatically associated with the product feed and/or the task associated with the product feed. In some embodiments, the comments may comprise machine instructions for an automated task performer unit to carry out. In some embodiments, such comments may be marked by a third symbol followed by the first symbol (e.g. "#!"). The symbols shown herein are generally provided as examples only. Other symbols may be used without departing from the spirit of the invention. The actions menu 903 may provide options for the user to edits the feed's name, scribble on the feed, add arrows, add text, and share the feed with others.

In some embodiments, the task units, tasks, and product feeds displayed to a user in the user interfaces described with reference to FIGS. 3-9 may be based on the user's account and task team association. For example, a user may only be shown information associated with task teams including the user. In some embodiments, users may be assigned different level of permission to view, modify, and/or delete tasks and feeds.

The layout, design, icons, images, displayed information in FIGS. 3-9 are provided as examples only. The system for facilitating task communication and assignment may be variously implemented without departing from the spirit of the present disclosure.

In one embodiment, a system for facilitating task assignments and communications comprises a task database storing a plurality of tasks, each task comprising a target identifier, one or more task instruction identifiers, and one or more task team member identifiers, a communication device configured to communicate with a plurality of user devices, and a processor coupled to the task database and the communication device. The processor being configured to provide, via the communication device, a task defining interface on a first user device associated with a first task team member, receive, via the task defining interface implemented on the first user device, a first task request for defining a first task, the first task request comprising a first task identifier associated with a target location, a task instruction identifier comprising a first symbol followed by a task instruction, and a plurality of task team member identifiers each comprising a second symbol followed by a user handle, wherein the task instruction specifies one or more characteristics of the first task to be performed at the target location, generate a first task record in response to receiving the first task request and store the first task record in the task database, the first task record comprises the first task identifier, the task instruction identifier, and the plurality of task team member identifiers, provide a task view interface configured to display tasks associated with a user account based on task team member identifiers associated with the plurality of tasks in the task database, and automatically communicate, via the task view interface, each of the one or more task instruction identifiers associated with the first task record to each task team member associated with the first task record.

In one embodiment, a method for facilitating task assignments and communications comprises providing, via a processor coupled with a communication device, a task defining interface on a first user device associated with a first task team member, receiving, via the task defining interface implemented on the first user device, a first task request for defining a first task, the first task request comprising a first task identifier associated with a target location, a task instruction identifier comprising a first symbol followed by a task instruction, and a plurality of task team member identifiers each comprising a second symbol followed by a user handle, wherein the task instruction specifies one or more characteristics of the first task to be performed at the target location, generating, with the processor, a first task record in response to receiving the first task request and store the first task record in the task database, the first task record comprises the first task identifier, the task instruction identifier, and the plurality of task team member identifiers, providing, with the processor and communication device, a task view interface configured to display tasks associated with a user account based on task team member identifiers associated with the plurality of tasks in a task database, the task database being configured to store a plurality of tasks each task comprising a target identifier, one or more task instruction identifiers, and one or more task team member identifiers, and automatically communicating, via the task view interface, each of the one or more task instruction identifiers associated with the first task record to each task team member associated with the first task record.

In one embodiment, an apparatus for facilitating task assignments and communications comprises a non-transitory storage medium storing a set of computer readable instructions and a control circuit configured to execute the set of computer readable instructions which causes to the control circuit to: provide, via a communication device, a task defining interface on a first user device associated with a first task team member, receive, via the task defining interface implemented on the first user device, a first task request for defining a first task, the first task request comprising a first task identifier associated with a target location, a task instruction identifier comprising a first symbol followed by a task instruction, and a plurality of task team member identifiers each comprising a second symbol followed by a user handle, wherein the task instruction specifies one or more characteristics of the first task to be performed at the target location, generate a first task record in response to receiving the first task request and store the first task record in the task database, the first task record comprises the first task identifier, the task instruction identifier, and the plurality of task team member identifiers, provide, via the communication device, a task view interface configured to display tasks associated with a user account based on task team member identifiers associated with the plurality of tasks in the task database, the task database being configured to store a plurality of tasks each task comprising a target identifier, one or more task instruction identifiers, and one or more task team member identifiers, and automatically communicate, via the task view interface, each of the one or more task instruction identifiers associated with the first task record to each task team member associated with the first task record.

Those skilled in the art will recognize that a wide variety of other modifications, alterations, and combinations can also be made with respect to the above-described embodi-

What is claimed is:

1. A system for facilitating task assignments and communications, the system comprising:
 a task database storing a plurality of tasks, each task comprising a target identifier, one or more task instruction identifiers, and one or more task team member identifiers;
 a communication device configured to communicate with a plurality of user devices; and
 a processor coupled to the task database and the communication device, the processor being configured to:
  provide, via the communication device, a task defining interface on a first user device associated with a first task team member;
  receive, via the task defining interface implemented on the first user device, a first task request for defining a first task, the first task request comprising a first task identifier associated with a target location, a task instruction identifier comprising a first symbol followed by a task instruction, and a plurality of task team member identifiers each comprising a second symbol followed by a user handle, wherein the task instruction specifies one or more characteristics of the first task to be performed at the target location;
  generate a first task record in response to receiving the first task request and store the first task record in the task database, the first task record comprises the first task identifier, the task instruction identifier, and the plurality of task team member identifiers;
  provide a task view interface configured to display tasks associated with a user account based on task team member identifiers associated with the plurality of tasks in the task database; and
  provide a task feed user interface to a plurality of task team members associated with the plurality of task team member identifiers of the first task record;
 wherein the task feed user interface comprises an image feed of images collected by a tasked unit and a free-form comment entry field;
 wherein a text string beginning with the first symbol that is entered into the free-form comment entry field is added as a new task instruction of the first task in the first task record;
 wherein the new task instruction entered via the comment entry field of the task feed user interface modifies a task execution of a processor-based system of the tasked unit collecting the images for the image feed; and
 wherein the processor is further configured to identify select task instructions for the processor-based system of the tasked unit among texts entered into the free-form comment entry field and selectively relay the select task instructions to the processor-based system of the tasked unit to trigger an automatic action of the tasked unit collecting the images for the image feed.

2. The system of claim 1, wherein the first task record is generated by:
 identifying the first task identifier in the first task request;
 identifying, in the first task request, the task instruction identifier based on identifying the first symbol and a concatenated accompanying task instruction comprising one of a set of predefined alphanumeric strings;
 associating the task instruction specified in the task instruction identifier with the first task identifier in the first task record;
 identifying, in the first task request, a plurality of task team members specified in the first task request based on identifying the second symbol and concatenated alphanumeric user handles; and
 associating, within the first task record, each of the plurality of task team members with the first task identifier.

3. The system of claim 1, wherein the processor is further configured to:
 receive, over time, a plurality of additional task communications; and
 for each additional task communication:
  identify a task record in the task database is associated with the additional task communication based on identifying a task identifier, comprising the first symbol concatenated by an alphanumeric task identifier, in the additional task communication;
  extract task status information in the additional task communication;
  identify team members associated the task based on task team member identifiers associated with the task record of the task; and
  automatically communicate the task status information to each of the team members associated with the task identifier.

4. The system of claim 3, wherein the task status information comprises one or more of: an additional task instruction, an image, a video, communications, movement information, a count of a type of object associated with the target location, and identifying information of a person associated with the target location.

5. The system of claim 1, wherein the task team member comprises an automated system configured to perform actions based on the task instruction associated with the first task and a person specified as participating in completing the first task.

6. The system of claim 5, wherein the automated system comprises an unmanned vehicle configured to:
 identify a first task instruction directed to the unmanned vehicle;
 automatically perform an action based on the first task instruction; and
 generate and transmit an additional task communication based on performance of the first task instruction.

7. The system of claim 1, wherein the task instruction comprises one or more of priority identifier, human operator instruction, machine instruction, drone instruction, task objective, or operational details.

8. The system of claim 1, wherein the task instruction identifier further comprises a third symbol following the first symbol to indicate that the task instruction corresponds to an instruction for the processor-based system.

9. The system of claim 8, wherein the third symbol comprises an exclamation mark "!".

10. The system of claim 1, wherein the plurality of tasks comprises tasks to be performed by one or more of an unmanned aerial vehicle, a manned aerial vehicle, a piloted aerial vehicle, an autonomous aerial vehicle, a manned ground vehicle, an unmanned ground vehicle, and personnel.

11. The system of claim 1, wherein the first task comprises one or more of data collection task, supply delivery task, or military strike task.

12. The system of claim 1, wherein the task defining interface comprises a graphical display of a map configured to receive a location selection to define the target location.

13. The system of claim 1, wherein the task view interface comprises a graphical display of a map displaying tasks at corresponding target locations and tasks on the map are represented by markers comprising color-coded status indicators.

14. The system of claim 1, wherein the processor is further configured to:
receive task performance statuses from a plurality of task performer units via the communication device; and
display task performance statuses in the task view interface.

15. The system of claim 1, wherein the first symbol comprises a "pound" symbol (#).

16. The system of claim 1, wherein the second symbol comprises an "at" symbol (@).

17. A method for facilitating task assignments and communications, the method comprising:
providing, via a processor coupled with a communication device, a task defining interface on a first user device associated with a first task team member;
receiving, via the task defining interface implemented on the first user device, a first task request for defining a first task, the first task request comprising a first task identifier associated with a target location, a task instruction identifier comprising a first symbol followed by a task instruction, and a plurality of task team member identifiers each comprising a second symbol followed by a user handle, wherein the task instruction specifies one or more characteristics of the first task to be performed at the target location;
generating, with the processor, a first task record in response to receiving the first task request and store the first task record in a task database, the first task record comprises the first task identifier, the task instruction identifier, and the plurality of task team member identifiers;
providing, with the processor and the communication device, a task view interface configured to display tasks associated with a user account based on task team member identifiers associated with a plurality of tasks in the task database, the task database being configured to store the plurality of tasks each task comprising a target identifier, one or more task instruction identifiers, and one or more task team member identifiers; and
providing a task feed user interface to a plurality of task team members associated with the plurality of task team member identifiers of the first task record;
wherein the task feed user interface comprises an image feed of images collected by a tasked unit and a free-form comment entry field;
receiving a text string beginning with the first symbol entered into the free-form comment entry field and adding the text string beginning with the first symbol as a new task instruction of the first task in the first task record;
modifying a task execution of a processor-based system of the tasked unit collecting the images for the image feed based on the new task instruction; and
identifying, with the processor, select task instructions for the processor-based system of the tasked unit among texts entered into the free-form comment entry field and selectively relaying the select task instructions to the processor-based system of the tasked unit to trigger an automatic action of the tasked unit collecting the images for the image feed.

18. An apparatus for facilitating task assignments and communications, the apparatus comprising:
a non-transitory storage medium storing a set of computer readable instructions; and
a control circuit configured to execute the set of computer readable instructions which causes to the control circuit to:
provide, via a communication device, a task defining interface on a first user device associated with a first task team member;
receive, via the task defining interface implemented on the first user device, a first task request for defining a first task, the first task request comprising a first task identifier associated with a target location, a task instruction identifier comprising a first symbol followed by a task instruction, and a plurality of task team member identifiers each comprising a second symbol followed by a user handle, wherein the task instruction specifies one or more characteristics of the first task to be performed at the target location;
generate a first task record in response to receiving the first task request and store the first task record in a task database, the first task record comprises the first task identifier, the task instruction identifier, and the plurality of task team member identifiers;
provide, via the communication device, a task view interface configured to display tasks associated with a user account based on task team member identifiers associated with a plurality of tasks in the task database, the task database being configured to store the plurality of tasks each task comprising a target identifier, one or more task instruction identifiers, and one or more task team member identifiers; and
provide a task feed user interface to a plurality of task team members associated with the plurality of task team member identifiers of the first task record;
wherein the task feed user interface comprises an image feed of images collected by a tasked unit and a free-form comment entry field;
wherein a text string beginning with the first symbol that is entered into the free-form comment entry field is added as a new task instruction of the first task in the first task record;
wherein the new task instruction entered via the comment entry field of the task feed user interface modifies a task execution of a processor-based system of the tasked unit collecting the images for the image feed; and
wherein the control circuit is further configured to identify select task instructions for the processor-based system of the tasked unit among texts entered into the free-form comment entry field and selectively relay the select task instructions to the processor-based system of the tasked unit to trigger an automatic action of the tasked unit collecting the images for the image feed.

* * * * *

UNITED STATES PATENT AND TRADEMARK OFFICE
CERTIFICATE OF CORRECTION

PATENT NO. : 11,164,121 B1
APPLICATION NO. : 16/022575
DATED : November 2, 2021
INVENTOR(S) : Justin W. Snider et al.

Page 1 of 1

It is certified that error appears in the above-identified patent and that said Letters Patent is hereby corrected as shown below:

In the Claims

In Claim 3, Column 16, Line 24, after "associated" insert -- with --

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*